US012803911B2

(12) United States Patent
Ali et al.

(10) Patent No.: US 12,803,911 B2
(45) Date of Patent: Nov. 17, 2026

(54) CONTROLLER-BASED SEGMENT ROUTING (SR) CIRCUIT-STYLE NETWORK MINIMIZING NEED FOR TRANSIT POLICIES IN IPV6 TRANSPORT USING SRV6 MICRO SEGMENT IDENTIFIER (MSID)

(71) Applicant: Cisco Technology, Inc., San Jose, CA (US)

(72) Inventors: Zafar Ali, Hicksville, NY (US); Clarence Filsfils, Brussels (BE); Francois Clad, Horbourg-Wihr (FR)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 18/929,858

(22) Filed: Oct. 29, 2024

(65) Prior Publication Data

US 2026/0121979 A1 Apr. 30, 2026

(51) Int. Cl.
*H04L 45/745* (2022.01)
*H04L 45/125* (2022.01)
*H04L 45/17* (2022.01)

(52) U.S. Cl.
CPC .......... *H04L 45/745* (2013.01); *H04L 45/125* (2013.01); *H04L 45/17* (2022.05)

(58) Field of Classification Search
CPC ...... H04L 45/745; H04L 45/17; H04L 45/125
See application file for complete search history.

(56) References Cited

U.S. PATENT DOCUMENTS 11,838,210 B2 * 12/2023 Williams ................ H04L 45/22
2021/0029021 A1 1/2021 Torvi et al.
2022/0086078 A1 3/2022 Sivabalan et al.
2022/0182323 A1 * 6/2022 Hu .......................... H04L 45/50
2022/0286395 A1 * 9/2022 Gandhi ................... H04L 45/20
2023/0009602 A1 * 1/2023 Filsfils .................... H04L 43/12
(Continued)

FOREIGN PATENT DOCUMENTS

WO WO-2021036328 A1 * 3/2021 ......... H04L 49/3009
WO WO2023287651 A1 1/2023

OTHER PUBLICATIONS

Search Report and Written Opinion for International Application No. PCT/US25/51293, Dated Feb. 9, 2026, 17 pages.

*Primary Examiner* — Kristie D Shingles
(74) *Attorney, Agent, or Firm* — Lee & Hayes, P.C.

(57) ABSTRACT

Techniques and architecture are described for a controller that encodes hop-by-hop unprotected adjacency SIDs in SRv6 μSID compressed carriers in IPV6 destination address (DA) and segment routing heading (SRH). In configurations, the adjacency SIDs are locally scoped and require encoding of a node SID followed by the adjacency SID. However, network devices are updated to handle back-to-back adjacency SIDs as the SR circuit-style SID list is computed and encoded hop-by-hop. The techniques and architecture also provide a F3208 μSID format, which provides compressed data comprising eight bits. Using the F3208 μSID format, the controller may encode up to 14 hop-by-hop unprotected adjacency SIDs in a single 128-bit IPv6 address and an additional 14 adjacency SIDs+14 adjacency SIDs, which equals 28 adjacency SIDs, in the SRH. The F3208 format may be extended to handle cases where the number of interfaces is more than $2^8$, which equals 256 interfaces.

20 Claims, 8 Drawing Sheets

(56) References Cited

U.S. PATENT DOCUMENTS

| | | | |
|---|---|---|---|
| 2023/0021278 | A1 | 1/2023 | Filsfils et al. |
| 2023/0126801 | A1 | 4/2023 | Peng et al. |
| 2023/0146226 | A1 | 5/2023 | Sivabalan et al. |

* cited by examiner

CONTROLLER-BASED SEGMENT ROUTING (SR) CIRCUIT-STYLE NETWORK MINIMIZING NEED FOR TRANSIT POLICIES IN IPV6 TRANSPORT USING SRV6 MICRO SEGMENT IDENTIFIER (MSID)

TECHNICAL FIELD

The present disclosure relates generally to control plane provisioning and data plane transport and processing of packets in a segment routing (SR) circuit-style configured network that that utilizes a micro segment identifier (μSID) field comprising a plurality of SIDs, wherein at least some of the SIDs of the plurality of SIDs comprise compressed data comprising eight bits, and more particularly control plane provisioning and data plane transport and processing of packets in a SR circuit-style configured network that that utilizes a μSID field comprising a plurality of SIDs, wherein at least some of the SIDs of the plurality of SIDs comprise compressed data comprising eight bits within a novel control arrangement and novel workflow.

BACKGROUND

The communications industry is rapidly changing to adjust to emerging technologies and ever-increasing customer demand. This customer demand for new applications and increased performance of existing applications is driving communications networks and system providers to employ networks and systems having greater speed and capacity (e.g., greater bandwidth). In trying to achieve these goals, a common approach taken by many communications providers is to use packet switching technology using Internet Protocol (IP). IP packets are typically forwarded in a network based on one or more values representing network nodes or paths.

Segment routing (SR) is a network technology that can enhance packet switching using a source routing paradigm. SR is applicable to both Multiprotocol Label Switching (SR-MPLS) and IPV6 (SRv6) data planes. In a SR network, a source node (i.e., a headend or ingress provider edge (PE) node) chooses a path and encodes it in the packet header as an ordered list of segments that provide a unidirectional list of segments that identify the designated routing path towards a destination node (i.e., a tailend or egress provider edge (PE) or endpoint node).

SR circuit style policy for SR-MPLS is a controller-based solution where a crosswork optimization engine (COE) computes and installs bandwidth-guaranteed paths in the network to carry time division multiplexing (TDM) style traffic. The SR circuit style policies are installed by the COE using unprotected adjacency segment identifiers (SIDs) to guarantee a path having sufficient bandwidth with explicit bandwidth booking at the COE. Hence, each network device (e.g., router, switch, etc.) is required to support encoding the number of SIDs equal to the network's diameter. For example, many network devices support handling, e.g., reading and encoding SIDs comprising sixteen compressed bits, generally referred to as a F3216 μSID format. However, for both SR-MPLS and SRv6 μSID, some network device platforms do not support a maximum stack depth (MSD) limit used to satisfy the requirement of supporting encoding the number of SIDs equal to the network's diameter.

Currently, an alternative for network devices that are unable to satisfy the MSD limit is to install transit policies with binding SIDs (BSIDs). However, installing and maintaining transit policies is extremely complex. For example, the COE needs to (1) find the network devices that need to have such transit policies installed, program bidirectional transit policies at those network devices, and ensure that the transit policies are installed correctly; (2) use the policies' BSID to construct a reduced segment list and install the reduced segment list at the endpoints of the transit policy; and (3) continue monitoring transit policies as the transit policy BSID changes in cases of a transit router reload. In such reload events, new transit policies must be installed, and the end-to-end policy needs to be modified and installed accordingly.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
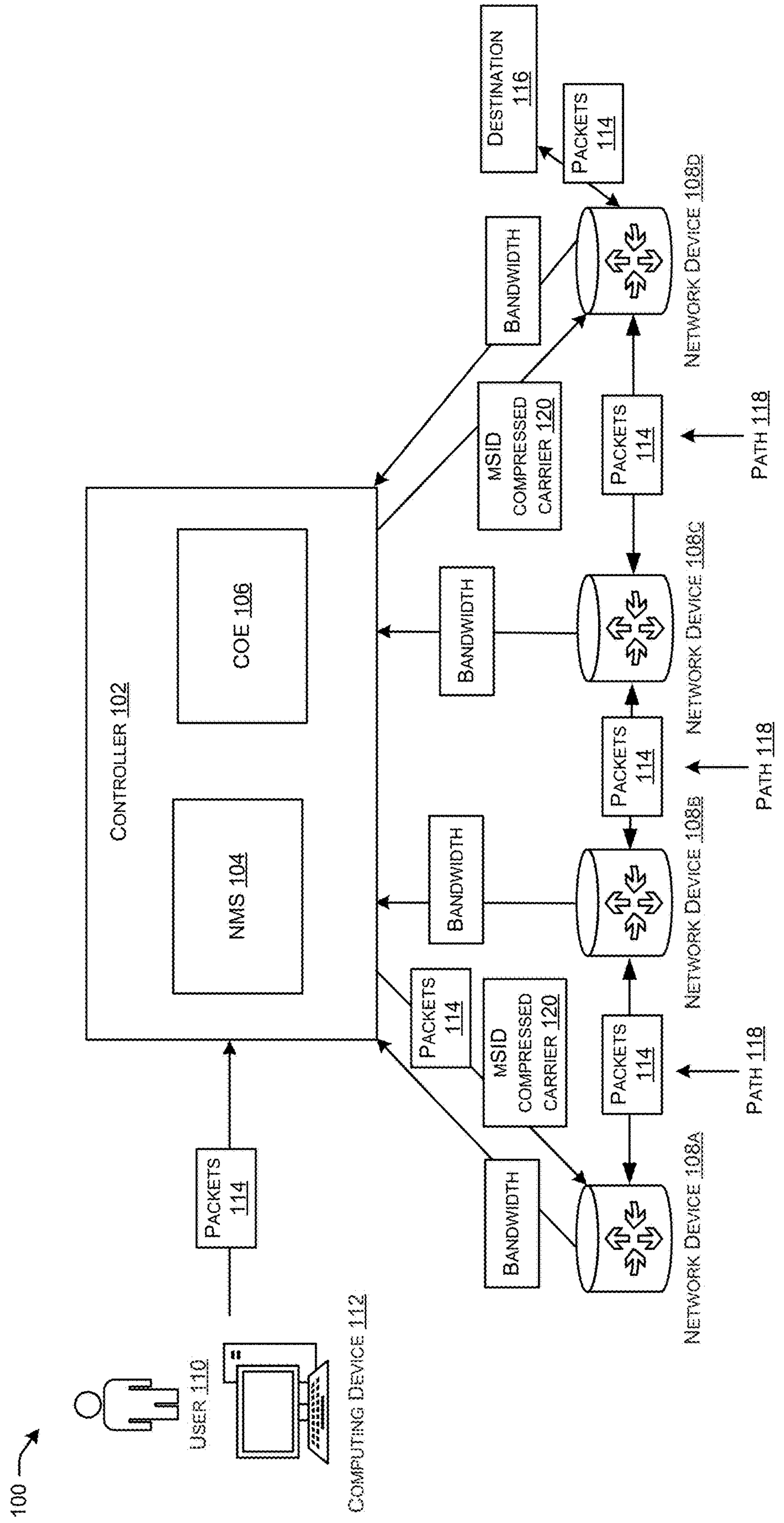
FIGS. 1A-1F schematically illustrate examples of a portion of a network that uses a μSID compressed carrier for transporting and processing of packets in a segment routing (SR) circuit-style configured network, in accordance with techniques and architecture described herein.

The present disclosure provides techniques and architecture for control plane provisioning and data plane transport and processing of packets in a segment routing (SR) circuit-style configured network that that utilizes a micro segment identifier (μSID) compressed carrier comprising a plurality of SIDs, wherein at least some of the SIDs of the plurality of SIDs comprise compressed data comprising eight bits. More particularly, the techniques and architecture provide a controller-based architecture for a SR circuit-style configured network that sets bandwidth-guaranteed protected paths using a SRv6 (μSID) compressed carrier.

In configurations, a controller, e.g., a crosswork optimization engine (COE)/hardware compatibility list (HCL)/cross network controller (CNC), encodes the hop-by-hop unprotected adjacency SIDs in SRv6 μSID compressed carriers in an IPV6 destination address (DA) and segment routing heading (SRH). In configurations, the adjacency SIDs are locally scoped and require encoding of a node SID followed by the adjacency SID. However, network devices are updated to handle back-to-back adjacency SIDs as the SR circuit-style SID list is computed and encoded hop-by-hop. The techniques and architecture also provide a new F3208 μSID format, which provides compressed data comprising eight bits. Using the F3208 μSID format, the controller may encode up to 14 hop-by-hop unprotected adjacency SIDs in a single 128-bit IPv6 address and an additional 14 adjacency SIDs+14 adjacency SIDs, which equals 28 adjacency SIDs, in the SRH. The techniques and architecture also handle cases for extending the F3208 format to handle cases where the number of interfaces is more than 28, which equals 256 interfaces.

As an example, a method may comprise receiving, at a node within a segment routing (SR) circuit style configured network, a packet, wherein the packet comprises a micro segment identifier (μSID) compressed carrier, wherein the μSID compressed carrier includes a SID field that includes a plurality of SIDs, and wherein at least some of the SIDs of the plurality of SIDs comprise compressed data comprising eight bits. The method may also comprise processing, by the node, at least some of the SID field. The method may further comprise based at least on the processing, determining a SID for a next hop node for the packet. The method may additionally comprise forwarding, by the node, the packet to the next hop node.

Example Embodiments

In accordance with configurations described herein, as previously noted, the present disclosure provides techniques and architecture for control plane provisioning and data plane transport and processing of packets in a segment routing (SR) circuit-style configured network that that utilizes a micro segment identifier (μSID) compressed carrier comprising a plurality of SIDs, wherein at least some of the SIDs of the plurality of SIDs comprise compressed data comprising eight bits. More particularly, the techniques and architecture provide a controller-based architecture for a SR circuit-style configured network that sets bandwidth-guaranteed protected paths using a SRv6 (μSID) compressed carrier.

In configurations, a controller, e.g., a crosswork optimization engine (COE)/hardware compatibility list (HCL)/cross network controller (CNC), encodes the hop-by-hop unprotected adjacency SIDs in SRv6 μSID compressed carriers in an IPV6 destination address (DA) and segment routing heading (SRH). In configurations, the adjacency SIDs are locally scoped and require encoding of a node SID followed by the adjacency SID. However, network devices are updated to handle back-to-back adjacency SIDs as the SR circuit-style SID list is computed and encoded hop-by-hop. The techniques and architecture also provide a new F3208 μSID format for SIDs, which provides compressed data comprising eight bits. Using the F3208 μSID format, the controller may encode up to 14 hop-by-hop unprotected adjacency SIDs in a single 128-bit IPv6 address and an additional 14 adjacency SIDs+14 adjacency SIDs, which equals 28 adjacency SIDs, in the SRH. The techniques and architecture also handle cases for extending the F3208 format to handle cases where the number of interfaces is more than 28, which equals 256 interfaces.

In accordance with configurations, for the data plane setup for a SR circuit style configured network, the SID manager in a network device allocates an ID from 0-253 for all interfaces having the SR circuit-style service enabled (interfaces on which the bandwidth-guaranteed modular quality of service (QoS) command-line interface (CLI) (MQC) policies are installed). If the number of such interfaces exceeds 255, an extended SID space is used for encoding. The reserve value 0xFF in the F3208 encoding indicates that the SID encoding requires the extended SID space of the next 8 bits.

When a node receives a packet destined for Z and Z is a local End.X SID encoded using the F3208 format described herein and non-extended SID space, the node shifts the node address by 8 bits and forwards the packet based on the resulting address. If the extended SID space (SID value of 0XFF) is used, the local SID is processed by shifting the address by 16 bits and forwarding the packet based on the resulting address. The network device may receive and process a local adjacency SID without the node SID in the SID list. This is because when encoding hop-by-hop adjacency SIDs for SR circuit style, there is no need to add the node SID in the SID list.

Interior gateway protocol (IGP) (ISIS) installs the F3208 SIDs in F1B and floods them into the topology. Such SIDs may be installed using a management plane and are reported to the controller via telemetry. MQC policies may be used to assign interface bandwidth dedicated to SR circuit style traffic. For this purpose, the SR circuit style may use a dedicated dynamic host configuration protocol (DHCP) value in the SR circuit style configured network.

In configurations, a controller, e.g., a crosswork optimization engine (COE), learns the F3208 SIDs and the associated bandwidth via IGP or a telemetry channel. The COE assumes ownership of bandwidth for all of the SIDs. When a request to create a bi-directional SR circuit-style policy is made, the COE computes a path to satisfy the requested bandwidth. The COE picks the unprotected F3208 adjacency SIDs in encoding the path to the SID list provided to the network device. The COE only considers the unprotected F3208 adjacency SIDs having enough bandwidth. The bandwidth tracking for SR circuit-style policies is centralized at the COE. The path computation may require COE to consider other metrics such as, for example, cost, latency, and additional constraints such as affinity, shared risk link group (SRLG) for diversity, etc. In configurations, the COE may be required to compute a protected bi-directional path. In configurations, the COE is part of a controller, which may perform one or more of the functions of the COE described herein itself.

Once the path is computed, the path must be encoded to determine the need for a segment routing header (SRH). The controller starts encoding the path into an μSID carrier using a F3208 format. As previously noted, the F3208 format provides SIDs compressed into 8 bits, as opposed to F3216, which provides SIDs compressed into 16 bits. Specifically, the controller first encodes the 32-bit locator in the IPV6 destination address (DA). The rest of the 96 bits, referred to as a uSID carrier, are now available to pack SRv6 uSIDs (SIDs compressed into 8 bits). The controller walks over the segment list (SL) of the end-to-end path that needs to be encoded in the uSID carrier. For each next SID, if the F3208 SID value is between 0-253, the COE encodes the SID using the next 8 bits in the uSID carrier. Otherwise, the COE uses the next 16 bits to encode the SID. The process continues until all SIDs are encoded in the uSID carrier or the uSID carrier runs out of space. If the COE runs out of uSID carrier space in the IPv6 destination address, an SRH is added to the encoded packet. The process of adding the rest of the SIDs continues by using a new uSID carrier in the SRH. Some platforms can support the insertion of two SRHs without recycling. Hence, 42 F3208 SIDs may be encoded without exceeding the maximum stack depth (MSD) limit of such platforms. Thus, there is no need to install a transit policy as with prior arrangements.

The COE programs the headend router with the packed uSID carrier. Without loss of generality, the COE may also program an unpacked SID-list, and the network device performs the packing. Without loss of generality, the SID packing may also be done at the network device. The reverse path is also packed and installed at the tail-end routers using the above-mentioned process. A protected path may also be installed at the headend and tail-end network device using the above-mentioned process.

Accordingly, in configurations, a method comprises receiving, at a node within a segment routing (SR) circuit style configured network, a packet, wherein the packet comprises a micro segment identifier (μSID) compressed carrier, wherein the μSID compressed carrier includes a SID field that includes a plurality of SIDs, and wherein at least some of the SIDs of the plurality of SIDs comprise compressed data comprising eight bits. The method also comprises processing, by the node, at least part of the SID field. The method further comprises based at least on the processing, determining a SID for a next hop node for the packet. The method additionally comprises forwarding, by the node, the packet to the next hop node.

In some configurations, the determining the SID for the next hop node for the packet comprises shifting, by the node, eight bits from the SID for the node in the SID field to determine the SID for the next hop node within the SR circuit style configured network.

In further configurations, the determining the SID for the next hop node for the packet comprises reading, by the node, at least one bit in the SID field; determining, by the node, that the at least one bit indicates a need to obtain the SID for the next hop node from a table within the node; shifting, by the node, eight bits from the SID for the node in the SID field to determine an address within the table; and reading, by the node, the address within the table to obtain the SID for the next hop node.

In additional configurations, the method further comprises determining, by a crosswork optimization engine (COE) of the SR circuit style configured network, a route for the packet within the SR circuit style configured network from the node to a destination node, wherein the route comprises a plurality of nodes, and wherein the determining the route comprises selecting the plurality of nodes based at least in part on available bandwidth of nodes between the node and the destination node.

In some configurations, at least some nodes between the node and the destination node are not configured to process SIDs comprising compressed data comprising eight bits and the determining the route comprises preferentially selecting, by the COE, nodes for the route that are configured to process SIDs comprising compressed data comprising eight bits.

In further configurations, the COE and a network management service (NMS) are co-located within the SR circuit style configured network and the method further comprises providing, by the COE, bandwidth policies with respect to the route to at least the node and the destination node.

In additional configurations, at least some of the nodes selected by the COE are not configured to process SIDs comprising compressed data comprising eight bits.

In some configurations, the method further comprises providing, by the COE, the bandwidth policies with respect to the route to the at least some of the nodes selected by the COE that are not configured to process SIDs comprising compressed data comprising eight bits.

In further configurations, receiving the packet comprises receiving, by the node from a server, the packet and the packet is in a form of a compressed Internet Protocol (IP) v6 packet.

Thus, the techniques and architecture described herein provide for control plane provisioning and data plane transport and processing of packets in a segment routing (SR) circuit-style configured network that that utilizes a micro segment identifier (μSID) compressed carrier comprising a plurality of SIDs, wherein at least some of the SIDs of the plurality of SIDs comprise compressed data comprising eight bits. More particularly, the techniques and architecture provide a controller-based architecture for a SR circuit-style configured network that sets bandwidth-guaranteed protected paths using a SRv6 (μSID) compressed carrier. In configurations, a controller, e.g., a crosswork optimization engine (COE)/hardware compatibility list (HCL)/cross network controller (CNC), encodes the hop-by-hop unprotected adjacency SIDs in SRv6 μSID compressed carriers in the IPV6 destination address (DA) and segment routing heading (SRH). In configurations, the adjacency SIDs are locally scoped and require encoding of a node SID followed by the adjacency SID. However, network devices are updated to handle back-to-back adjacency SIDs as the SR circuit-style SID list is computed and encoded hop-by-hop. The techniques and architecture also provide a new F3208 μSID format, which provides compressed data comprising eight bits. Using the F3208 μSID format, the controller may encode up to 14 hop-by-hop unprotected adjacency SIDs in a single 128-bit IPv6 address and an additional 14 adjacency SIDs+14 adjacency SIDs, which equals 28 adjacency SIDs, in the SRH. The techniques and architecture also handle cases for extending the F3208 format to handle cases where the number of interfaces is more than 28, which equals 256 interfaces.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A schematically illustrates a portion of an example network 100. In configurations, the network is configured as a segment routing (SR) circuit style network. The network 100 includes a controller 102. In configurations, the controller 102 includes a network management service (NMS) 104 and a crosswork authorization engine (COE) 106. In configurations, the controller may also include or alternatively include a cross-work network controller (CNC) (not illustrated). In some configurations, the controller may also include a hardware compatibility list (HCL) (not illustrated). In configurations, the controller 102 and COE 106 may be at least partially combined, e.g., the controller 102 may perform one or more of the functions of the COE 106 described herein itself. Likewise, in some configurations, the controller 102 and NMS 104 may be at least partially combined, e.g., the controller 102 may perform one or more of the functions of the NMS 104 described herein itself.

The network 100 further includes a plurality of network devices 108. In the example of FIG. 1A, four network devices 108*a*-108*d*, are illustrated. The plurality of network devices 108 may be in the form of, for example, routers, switches, etc. In configurations, the network devices 108 may advertise their bandwidth to the controller 102. In accordance with some configurations, the bandwidth is advertised to the COE 106.

In configurations, a user 110 may use a computing device 112 to send packets 114 to a destination 116 via the network. For example, the user 110 may wish to send packets 114 to another electrical device, a website, a web service, etc. The packets 114 may be provided to the controller 102. In configurations, the controller 102, e.g., the COE 106, may determine nodes, e.g., network devices 108, within the network 100 through which the packets 114 should pass in order to reach the destination 116. For example, the COE 106 may select network devices 108*a*, 108*b*, 108*c*, and 108*d* through which the packets should pass, e.g., a selected bandwidth guaranteed protected path 118 may include network devices, 108*a*, 108*b*, 108*c*, and 108*d*. This selection of the path 118 may be based, for example, upon needed bandwidth for the packets 114, as well as their processing (e.g., encoding and reading) capabilities. Thus, the network devices 108 may be selected based upon the network devices 108 advertising of their available bandwidth and processing capabilities. The COE 106 only selects network devices 108 that have sufficient bandwidth.

Thus, the COE 106 may select a bandwidth guaranteed protected path 118 that includes network devices 108*a*, 108*b*, 108*c*, and 108*d*. The bandwidth is guaranteed and protected at the network devices 108*a*, 108*b*, 108*c*, and 108*d* to ensure the packets 114 successful transmission along the path 118. In configurations, the path 118 selected by the COE 106 may also be selected based upon consideration of other metrics such as, for example, cost, latency, and additional constraints such as affinity, shared risk lent group (SRLG) for diversity, etc.

Once the bandwidth-guaranteed protected path 118 has been selected, the segment identifiers (SIDs) of the selected network devices 108 of the path 118 may be encoded in s SID field using a SRv6 (μSID) compressed carrier 120 in a 128 bit IPv6 destination address (DA) and segment routing heading (SRH), as described herein. In configurations, the μSID compressed carrier 120 is provided to the first node of the path 118, e.g., the first network device 108*a*, and includes the network identifier (NID) and the SIDs of the network devices 108, as well as the end ID of the destination 116. In configurations, the μSID compressed carrier 120 may include the plurality of SIDs in eight bits of compressed data, e.g., the F3208 μSID format described herein. In some configurations, the NID is within the first 32 bits of compressed data. Packets 114 may be encoded by the first network device 108*a*, using the F3208 μSID format, with the μSID compressed carrier 120 to provide the segment routing of next hops, e.g., the path 118, that may be decoded by the subsequent network devices 108.

In configurations, the μSID compressed carrier 120 may be provided to the final node (generally as the reverse path), e.g., the final network device 108*d*, and includes the network identifier (NID) and the segment identifiers (SIDs) of the network devices 108, as well as an address of the computing device 112. Return packets 114 from the destination 116 destined for the computing device 112 may be encoded by the final network device 108*d*, using the F3208 μSID format, with the μSID compressed carrier 120 to provide the segment routing of next hops, e.g., the reverse path 118, that may be decoded by the subsequent network devices 108.

Figure 1B:
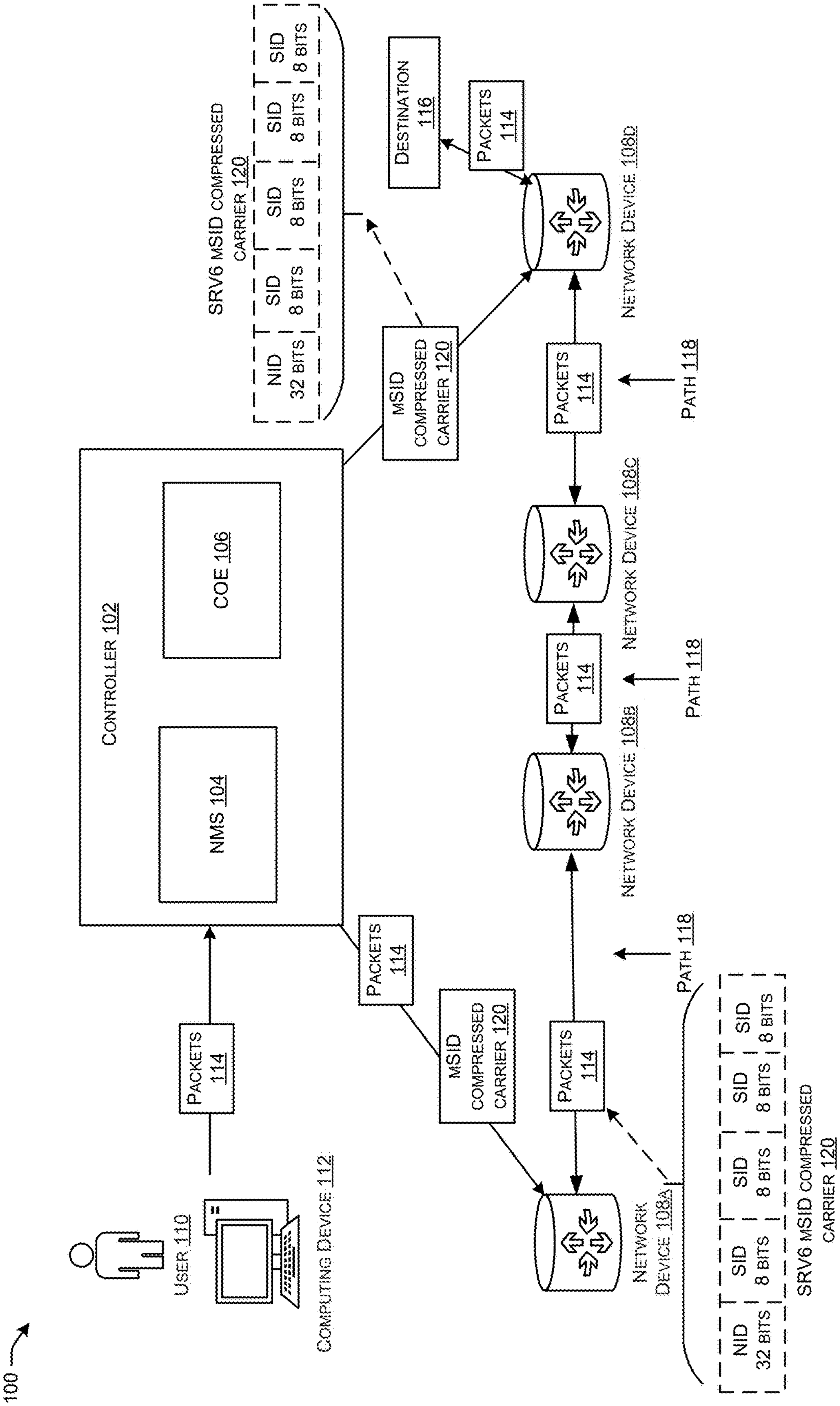

FIG. 1B schematically illustrates an example of the portion of the network 100 using the μSID compressed carrier 120. A packet 114 may be received from the electronic device 112 of the user 110 at the controller 102. Once the COE 106 has selected the bandwidth guaranteed protected path 118, the first node, e.g., network device 108*a*, may receive the SRV6 μSID compressed carrier 120 from the COE 106. In configurations, the final node, e.g., network device 108*d*, may also receive the SRV6 μSID compressed carrier 120 from the COE 106, generally as the reverse path for return packets. Thus, when the packet 114 arrives at the first network device 108*a*, the first network device 108*a* may read the μSID compressed carrier 120 and encode the packet 114 with the SRV6 μSID compressed carrier 120. In configurations, the first network device 108*a* may shift the address eight bits. Thus, the first network device 108*a* may shift eight bits from its address within the μSID compressed carrier 120 to arrive at the eight bits that provide the SID for the second network device 108*b*. The packet 114 may then be forwarded by the first network device 108*a* to the second network device 108*b*. Once the second network device 108*b* receives the packet 114, the second network device 108*b* may shift the SID for the second network device 108*b* within the μSID compressed carrier 120 encoded in the packet 114 eight bits to arrive at the SID for the third network device 108*c*. The second network device 108*b* may then forward the packet 114 to the third network device 108*c*. The third network device 108*c* may shift the SID for the third network device 108*c* encoded in the packet 114 eight bits to arrive at the SID for the fourth network device 108*d*. The third network device 108*c* may then forward the packet 114 on to the fourth network device 108*d*. The fourth network device 108*d* may then shift eight bits from the SID for the fourth network device 108*d* encoded in the packet 114 to arrive at the address for the destination 116. The fourth network device 108*d* may then forward the packet 114 to the destination 116. As previously noted, in configurations, the COE 106 may provide the selected path 118 to the first network device 108*a* and the fourth network device 108*d* (generally as the reverse path). Thus, in configurations, the μSID compressed carrier 120 may not include the address for the destination 116 as the fourth network device 108*d* may already be aware of the address of the destination 116.

Figure 1C:
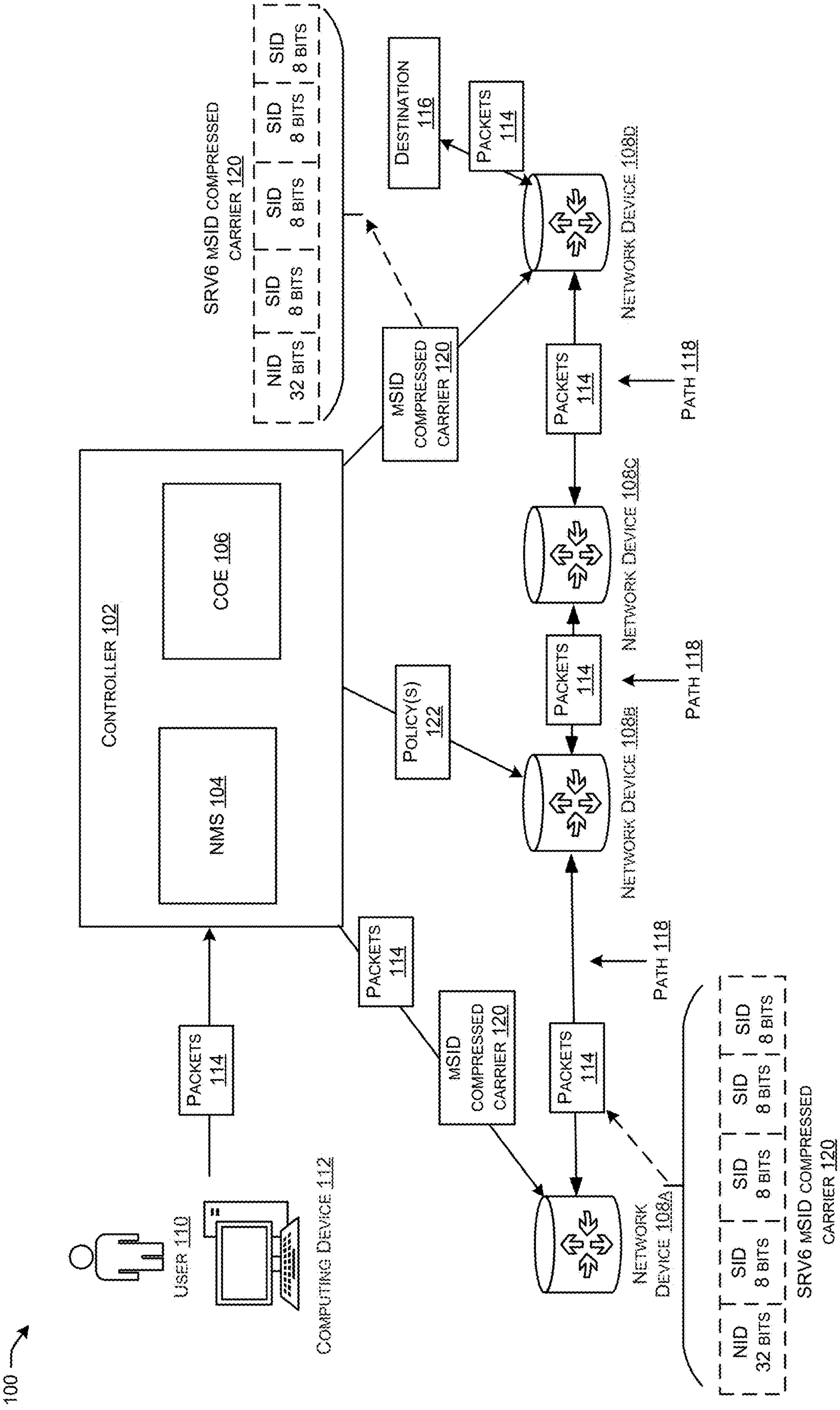

FIG. 1C schematically illustrates another example of the portion of the network 100 using the μSID compressed carrier 120. A packet 114 may be received from the electronic device 112 of the user 110 at the controller 102. However, one or more of the network devices 108 are not capable of handling, e.g., encoding and reading, SIDs comprising eight bits of compressed data, e.g., the F3208 μSID format described herein. Generally, such network devices are capable of handling e.g., encoding and reading, SIDs comprising sixteen bits of compressed data, e.g., the F3216 μSID format. For this example, it is assumed that network device 108*b* is not capable of handling, e.g., encoding and reading, eight bits of compressed data, e.g., the F3208 μSID format described herein. Thus, the COE 106 installs policy (s) 122 on the network device 108*b* for the next hop, e.g., the network device 108*c*.

Once the COE 106 has selected the bandwidth guaranteed protected path 118, the first node, e.g., network device 108*a*, may receive the SRV6 μSID compressed carrier 120 from the COE 106. In configurations, the final node, e.g., network device 108*d*, may also receive the SRV6 μSID compressed carrier 120 from the COE 106, generally as the reverse path for return packets. Thus, when the packet 114 arrives at the first network device 108*a*, the first network device 108*a* may read the μSID compressed carrier 120 and encode the packet 114 with the SRV6 μSID compressed carrier 120. In configurations, the first network device 108*a* may shift the address eight bits. Thus, the first network device 108*a* may shift eight bits from its address within the μSID compressed carrier 120 to arrive at the eight bits that provide the SID for the second network device 108*b*. The packet 114 may then be forwarded by the first network device 108*a* to the second network device 108*b*. Once the second network device 108*b* receives the packet 114, the second network device 108*b* may forward the packet 114 to the third network device 108*c* based on the policy(s) 122 installed on the second network device 108*b*. For example, the policy(s) 122 may provide the second network device 108*b* with the SID for the third network device 108*c*. The third network device 108*c* may shift the SID for the second network device 108*c* encoded in the packet 114 eight bits to arrive at the SID for the fourth network device 108*d*. The third network device 108*c* may then forward the packet 114 on to the fourth network device 108*d*. The fourth network device 108*d* may then shift eight bits from the SID for the fourth network device 108*d* encoded in the packet 114 to arrive at the address for the destination 116. The fourth network device 108*d* may then forward the packet 114 on to the destination 116. As previously noted, in configurations, the COE 106 may provide the selected path 118 to the first network device 108*a* and the fourth network device 108*d* (generally as the reverse path). Thus, in configurations, the μSID compressed carrier 120 may not include the address for the destination 116 as the fourth network device 108*d* may already be aware of the address of the destination 116.

Figure 1D:
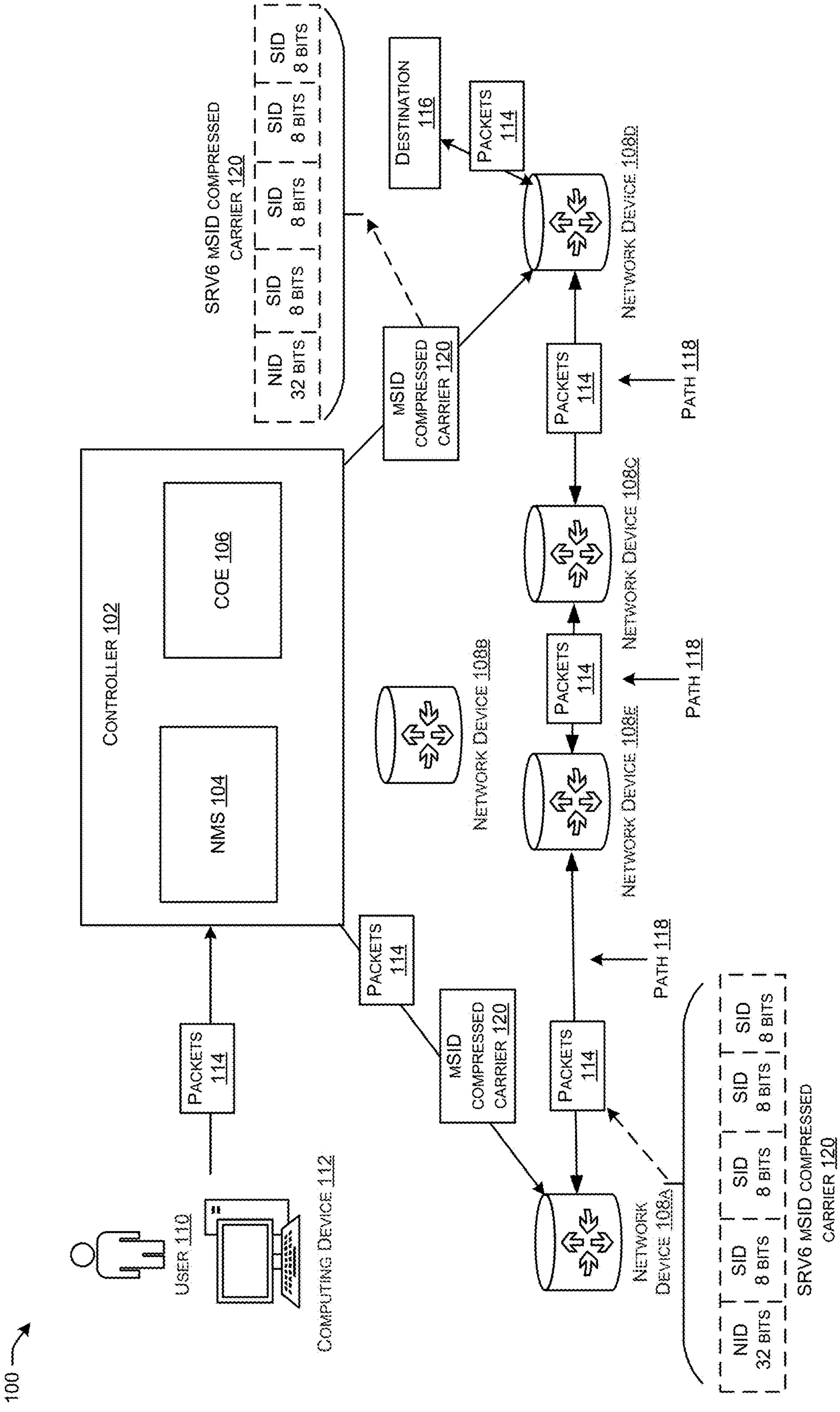

FIG. 1D schematically illustrates another example of the portion of the network 100 using the μSID compressed carrier 120. A packet 114 may be received from the electronic device 112 of the user 110 at the controller 102. However, one or more of the network devices 108 are not capable of handling, e.g., encoding and reading, SIDs comprising eight bits of compressed data, e.g., the F3208 μSID format described herein. Generally, such network devices are capable of handling e.g., encoding and reading, SIDs comprising sixteen bits of compressed data, e.g., the F3216 μSID format. For this example, it is assumed that network device 108*b* is not capable of handling, e.g., encoding and reading, eight bits of compressed data, e.g., the F3208 μSID format described herein. However, network device 108*e* is capable of handling, e.g., encoding and reading, eight bits of compressed data, e.g., the F3208 μSID format described herein. In configurations, the COE 106 prefers network devices 108 (nodes) for the bandwidth guaranteed protected path 118 that are capable of handling, e.g., encoding and reading, eight bits of compressed data, e.g., the F3208 μSID format described herein. Thus, the COE 106 selects the network device 108*e* for the next hop after network device 108*a* in the bandwidth guaranteed protected path 118 as opposed to the network device 108*b*.

Figure 1E:
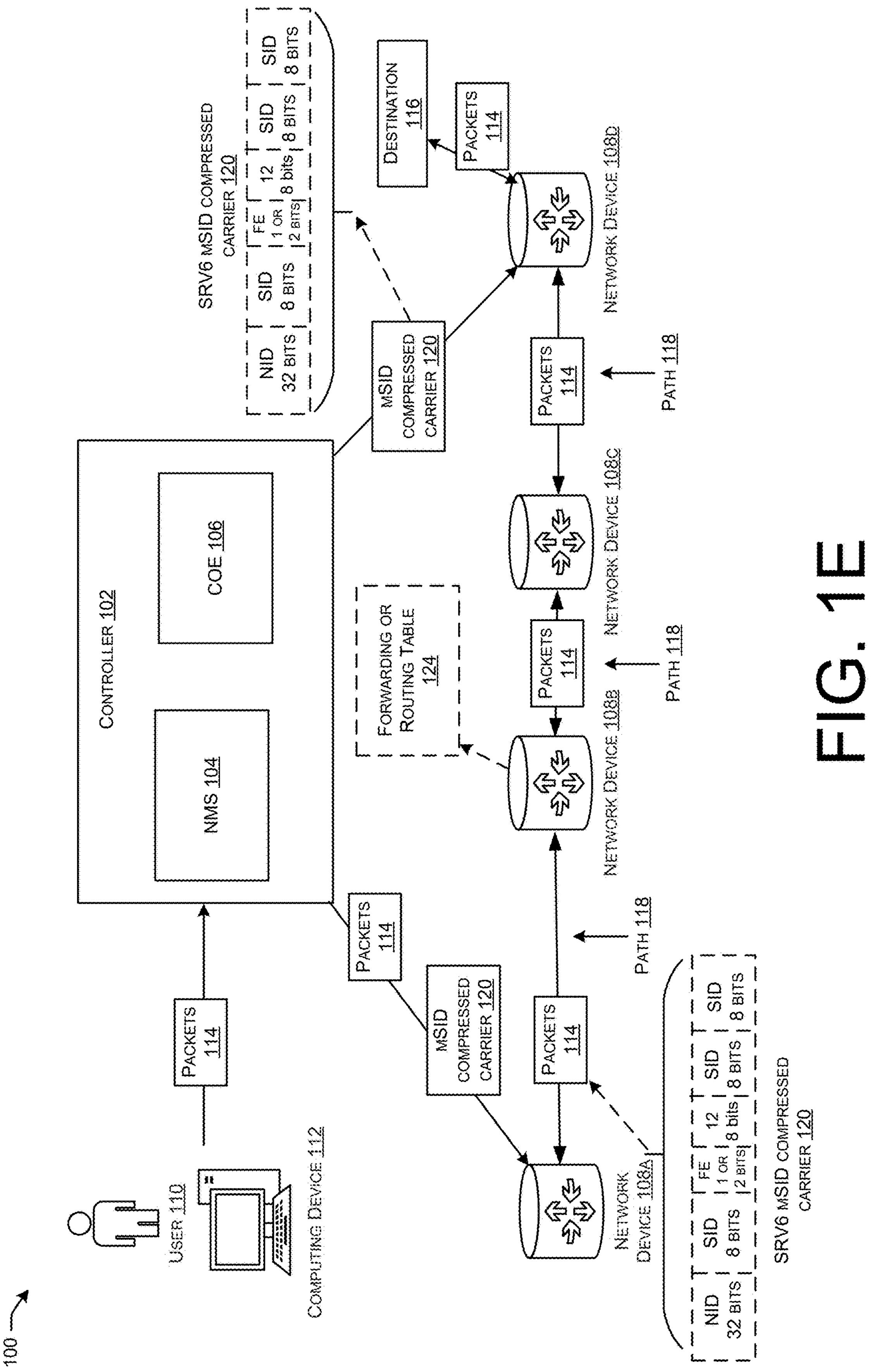

FIG. 1E schematically illustrates another example of the portion of the network 100 using the μSID compressed carrier 120. In configurations, the μSID compressed carrier 120 may include one or more extended bits that indicate that the network device 108*b* should check a forwarding or routing table 124 located on the network device 108 that provides the address for the next hop, e.g., the next network device 108*c* (node) to which the packet 114 should be forwarded. For example, if FE appears, then the second network device 108*b* may shift eight in the μSID compressed carrier 120 resulting in a location, e.g., 12, in the forwarding or routing table 124. This may indicate that the network device 108*b* should check location 12 within the forwarding or routing table 124 located on the network device 108*b* for the next hop address. The forwarding or routing table 124 may be provided to the network devices 108 by the controller 102, e.g., the COE 106.

Figure 1F:
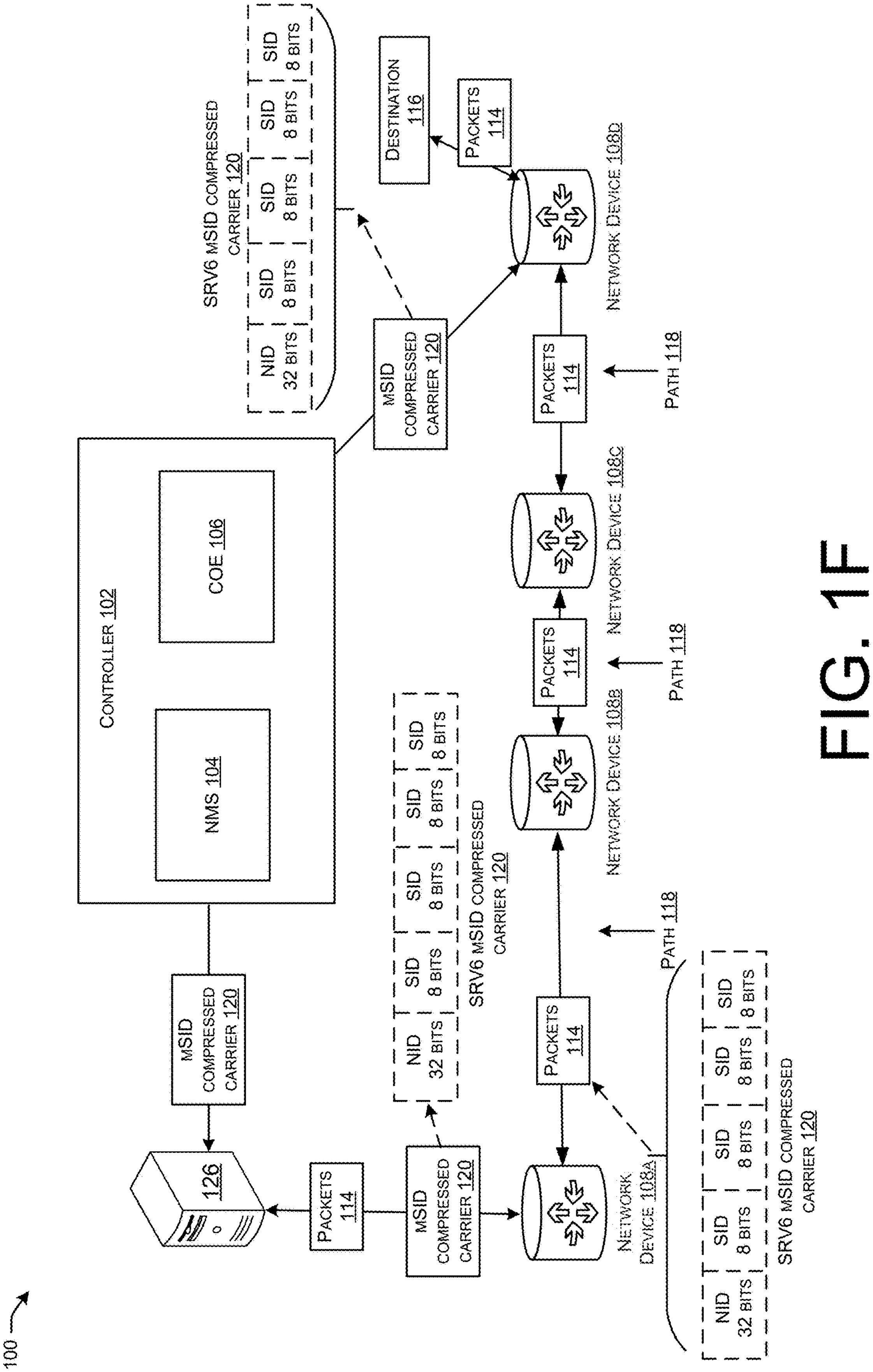

FIG. 1F schematically illustrates another example of the portion of the network 100 using the μSID compressed carrier 120. In the example, packets 114 are being provided to network device 108*a* from a server 126. For example, the server 126 may be part of a data center. The controller 102, e.g., the COE 106, provides the μSID compressed carrier 120 to the server 126. As is known, the SRv6 μSID compressed carrier 120 is generally encoded in path computation element protocol (PCEP) language. In many instances, the server 126 does not understand the PCEP language. In configurations, the controller 102 may configure and/or instruct the server 126 that when the server receives a SRv6 μSID compressed carrier 120, the server 126 should install it on the first node, e.g., in this example, the first network device 108*a*. Thus, the server does not need to understand the SRv6 μSID compressed carrier 120 and simply needs to understand the IPV6 address format. The SRv6 μSID compressed carrier 120 thus serves as a binding SID (BSID). The first network device 108*a* may encode subsequent packets 114 from the server 126 based on the SRv6 μSID compressed carrier 120, as described herein.

Figure 2:
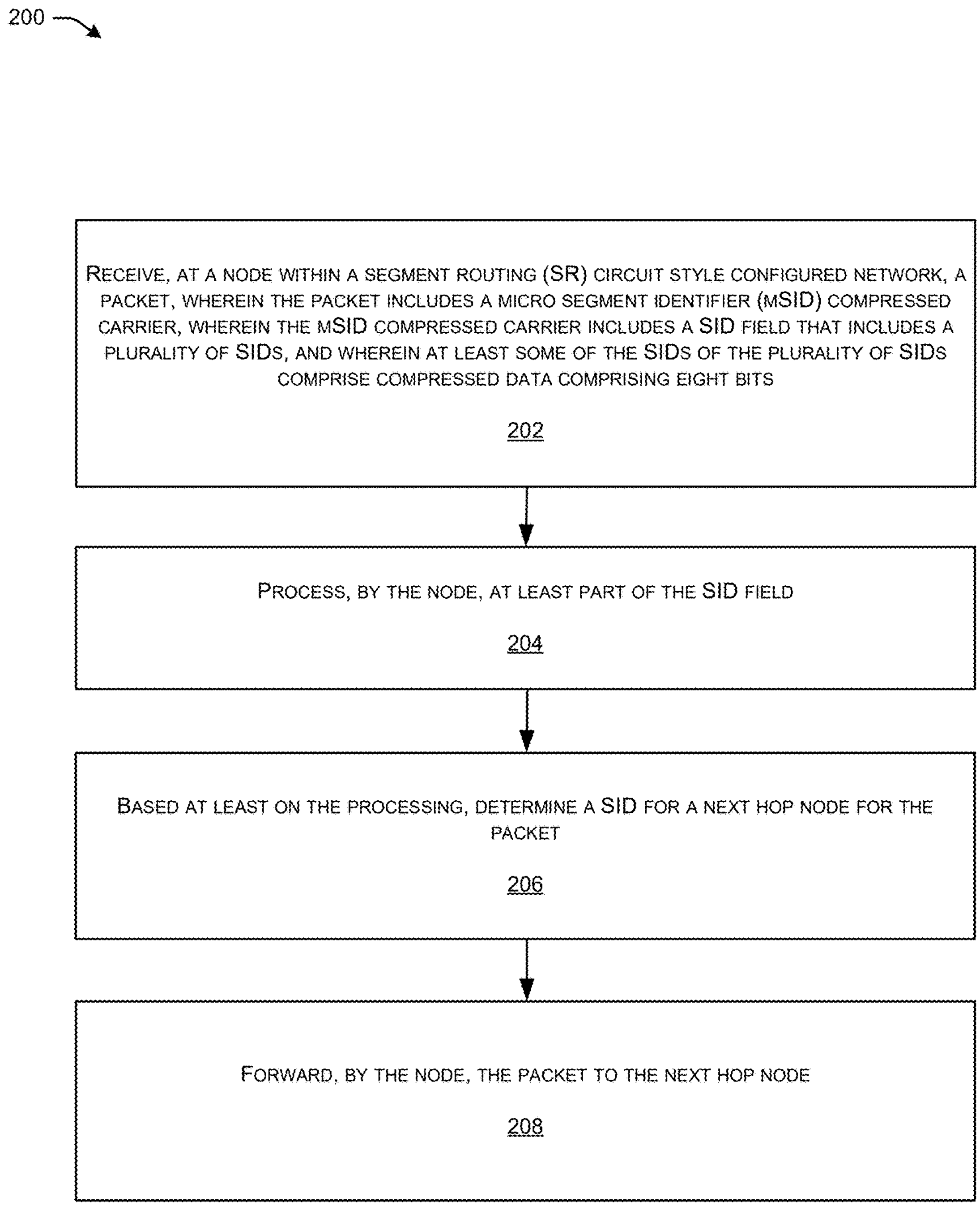
FIG. 2 illustrates a flow diagram of an example method for transporting and processing of packets in a segment routing (SR) circuit-style configured network, e.g., the example portions of the network in FIGS. 1A-1F, that utilizes a micro segment identifier (μSID) compressed carrier comprising a plurality of SIDs, wherein at least some of the SIDs of the plurality of SIDs comprise compressed data comprising eight bits, in accordance with the techniques and architecture described herein.

FIG. 2 illustrates a flow diagram of an example method 200 and illustrates aspects of the functions performed at least partly by devices of a network as described with respect to FIGS. 1A-1F. The logical operations described herein with respect to FIG. 2 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 2 illustrates a flow diagram of an example method 200 for transport and processing of packets in a segment routing (SR) circuit-style configured network that that utilizes a micro segment identifier (μSID) compressed carrier comprising a plurality of SIDs, wherein at least some of the SIDs of the plurality of SIDs comprise compressed data comprising eight bits. In some examples, the method 200 may be performed by a system comprising one or more processors and one or more non-transitory computer-readable media storing computer-executable instructions that, when executed by the one or more processors, cause the one or more processors to perform the method 200.

At 202, a node within a segment routing (SR) circuit style configured network receives a packet, wherein the packet includes a micro segment identifier (μSID) compressed carrier, wherein the μSID compressed carrier includes a SID field that includes a plurality of SIDs, and wherein at least some of the SIDs of the plurality of SIDs comprise compressed data comprising eight bits. For example, a packet 114 may be received from the computing device 112 of the user at the controller 102. Once the COE 106 has selected the bandwidth guaranteed protected path 118, the first node, e.g., network device 108*a*, may receive the SRV6 μSID compressed carrier 120 from the COE 106. In configurations, the final node, e.g., network device 108*d*, may also receive the SRV6 μSID compressed carrier 120 from the COE 106, generally as the reverse path for return packets.

At 204, the node processes at least part of the SID field. At 206, based at least on the processing, a SID for a next hop node for the packet is determined. For example, when the packet 114 arrives at the first network device 108*a*, the first network device 108*a* may read the μSID compressed carrier 120 and encode the packet 114 with the SRV6 μSID compressed carrier 120. In configurations, the first network device 108*a* may shift the address eight bits. Thus, the first network device 108*a* may shift eight bits from its address within the μSID compressed carrier 120 to arrive at the eight bits that provide the SID for the second network device 108*b*.

At 208, the node forwards the packet to the next hop node. For example, the packet 114 may then be forwarded by the first network device 108*a* to the second network device 108*b*. Once the second network device 108*b* receives the packet 114, the second network device 108*b* may shift the SID for the second network device 108*b* within the μSID compressed carrier 120 encoded in the packet 114 eight bits to arrive at the SID for the third network device 108*c*. The second network device 108*b* may then forward the packet 114 to the third network device 108*c*. The third network device 108*c* may shift the SID for the third network device 108*c* encoded in the packet 114 eight bits to arrive at the SID for the fourth network device 108*d*. The third network device 108*c* may then forward the packet 114 on to the fourth network device 108*d*. The fourth network device 108*d* may then shift eight bits from the SID for the fourth network device 108*d* encoded in the packet 114 to arrive at the address for the destination 116. The fourth network device 108*d* may then forward the packet 114 to the destination 116. As previously noted, in configurations, the COE 106 may provide the selected path 118 to the first network device 108*a* and the fourth network device 108*d*. Thus, in configurations, the μSID compressed carrier 120 may not include the address for the destination 116 as the fourth network device 108*d* may already be aware of the address of the destination 116.

Thus, the techniques and architecture described herein provide for control plane provisioning and data plane transport and processing of packets in a segment routing (SR) circuit-style configured network that that utilizes a micro segment identifier (μSID) compressed carrier comprising a plurality of SIDs, wherein at least some of the SIDs of the plurality of SIDs comprise compressed data comprising eight bits. More particularly, the techniques and architecture provide a controller-based architecture for a SR circuit-style configured network that sets bandwidth-guaranteed protected paths using a SRv6 (μSID) compressed carrier. In configurations, a controller, e.g., a crosswork optimization engine (COE)/hardware compatibility list (HCL)/cross network controller (CNC), encodes the hop-by-hop unprotected adjacency SIDs in SRv6 μSID compressed carriers in the IPV6 destination address (DA) and segment routing heading (SRH). In configurations, the adjacency SIDs are locally scoped and require encoding of a node SID followed by the adjacency SID. However, network devices are updated to handle back-to-back adjacency SIDs as the SR circuit-style SID list is computed and encoded hop-by-hop. The techniques and architecture also provide a new F3208 μSID format, which provides compressed data comprising eight bits. Using the F3208 μSID format, the controller may encode up to 14 hop-by-hop unprotected adjacency SIDs in a single 128-bit IPv6 address and an additional 14 adjacency SIDs+14 adjacency SIDs, which equals 28 adjacency SIDs, in the SRH. The techniques and architecture also handle cases for extending the F3208 format to handle cases where the number of interfaces is more than 28, which equals 256 interfaces.

Figure 3:
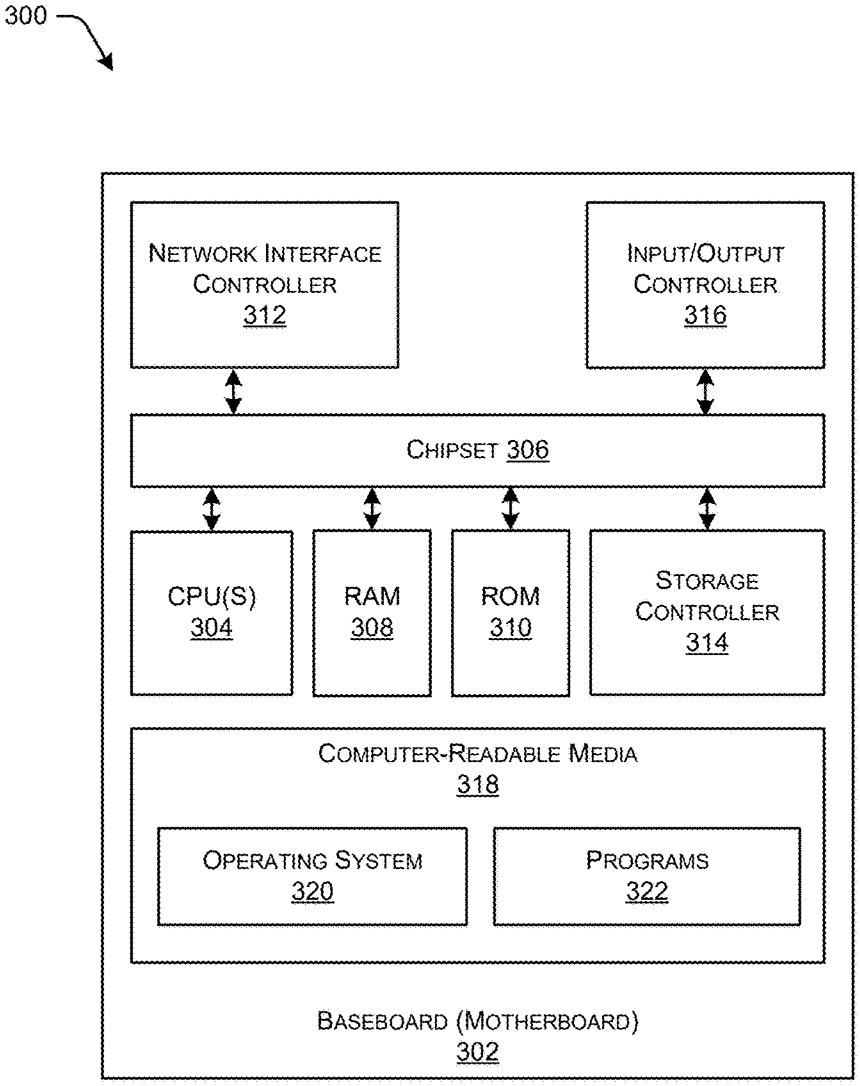
FIG. 3 is a computer architecture diagram showing an example computer hardware architecture for implementing a device that can be utilized to implement aspects of the various technologies presented herein.

FIG. 3 shows an example computer architecture for a computing device 300 capable of executing program components for implementing the functionality described above. In configurations, one or more of the computing devices 300 may be used to implement one or more of the components of FIGS. 1A-1F and 2. The computer architecture shown in FIG. 3 illustrates a conventional server computer, router, switch, workstation, desktop computer, laptop, tablet, network appliance, e-reader, smartphone, or other computing device such as, for example, a System-on-Chip (SoS), Application-specific Integrated Circuit (ASIC), etc., and can be utilized to execute any of the software components presented herein. The computing device 300 may, in some examples, correspond to a physical device or resources described herein.

The computing device 300 includes a baseboard 302, or "motherboard," which is a printed circuit board to which a multitude of components or devices can be connected by way of a system bus or other electrical communication paths. In one illustrative configuration, one or more central processing units ("CPUs") 304 operate in conjunction with a chipset 306. The CPUs 304 can be standard programmable processors that perform arithmetic and logical operations necessary for the operation of the computing device 300. One or more of the CPUs 304 may be replaced by one or more GPUs and/or one or more DPUs.

The CPUs 304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 306 provides an interface between the CPUs 304 and the remainder of the components and devices on the baseboard 302. The chipset 306 can provide an interface to a RAM 308, used as the main memory in the computing device 300. The chipset 306 can further provide an interface to a computer-readable storage medium such as a read-only memory ("ROM") 310 or non-volatile RAM ("NVRAM") for storing basic routines that help to startup the computing device 300 and to transfer information between the various components and devices. The ROM 310 or NVRAM can also store other software components necessary for the operation of the computing device 300 in accordance with the configurations described herein.

The computing device 300 can operate in a networked environment using logical connections to remote computing devices and computer systems through a network. The chipset 306 can include functionality for providing network connectivity through a NIC 312, such as a gigabit Ethernet adapter. In configurations, the NIC 312 can be a smart NIC (based on data processing units (DPUs)) that can be plugged into data center servers to provide networking capability. The NIC 312 is capable of connecting the computing device 300 to other computing devices over networks. It should be appreciated that multiple NICs 312 can be present in the computing device 300, connecting the computer to other types of networks and remote computer systems.

The computing device 300 can include a storage device 318 that provides non-volatile storage for the computer. The storage device 318 can store an operating system 320, programs 322, and data, which have been described in greater detail herein. The storage device 318 can be connected to the computing device 300 through a storage controller 314 connected to the chipset 306. The storage device 318 can consist of one or more physical storage units. The storage controller 314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 300 can store data on the storage device 318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 318 is characterized as primary or secondary storage, and the like.

For example, the computing device 300 can store information to the storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 300 can further read information from the storage device 318 by detecting the physical states or characteristics of one or more particular locations within the physical storage units.

In addition to the mass storage device 318 described above, the computing device 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 300. In some examples, the operations performed by the cloud network, and or any components included therein, may be supported by one or more devices similar to computing device 300. Stated otherwise, some or all of the operations described herein may be performed by one or more computing devices 300 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 318 can store an operating system 320 utilized to control the operation of the computing device 300. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 318 can store other system or application programs and data utilized by the computing device 300.

In one embodiment, the storage device 318 or other computer-readable storage media is encoded with computer-executable instructions which, when loaded into the computing device 300, transform the computer from a general-purpose computing system into a special-purpose computer capable of implementing the embodiments described herein. These computer-executable instructions transform the computing device 300 by specifying how the CPUs 304 transition between states, as described above. According to one embodiment, the computing device 300 has access to computer-readable storage media storing computer-executable instructions which, when executed by the computing device 300, perform the various processes described above with regard to FIGS. 1A-1F and 2. The computing device 300 can also include computer-readable storage media having instructions stored thereupon for performing any of the other computer-implemented operations described herein.

The computing device 300 can also include one or more input/output controllers 316 for receiving and processing input from a number of input devices, such as a keyboard, a mouse, a touchpad, a touch screen, an electronic stylus, or other type of input device. Similarly, an input/output controller 316 can provide output to a display, such as a computer monitor, a flat-panel display, a digital projector, a printer, or other type of output device. It will be appreciated that the computing device 300 might not include all of the components shown in FIG. 3, can include other components that are not explicitly shown in FIG. 3, or might utilize an architecture completely different than that shown in FIG. 3.

The computing device 300 may support a virtualization layer, such as one or more virtual resources executing on the computing device 300. In some examples, the virtualization layer may be supported by a hypervisor that provides one or more virtual machines running on the computing device 300 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a node within a segment routing (SR) circuit style configured network, a packet, wherein the packet includes a micro segment identifier (μSID) compressed carrier, wherein the μSID compressed carrier includes a SID field that includes a plurality of SIDs, and wherein at least some of the SIDs of the plurality of SIDs comprise compressed data comprising eight bits;

processing, by the node, at least part of the SID field;

based at least on the processing, determining a SID for a next hop node for the packet;

forwarding, by the node, the packet to the next hop node; and determining, by a crosswork optimization engine (COE) of the SR circuit style configured network, a route for the packet within the SR circuit style configured network from the node to a destination node, wherein the route comprises a plurality of nodes, wherein the determining the route comprises selecting the plurality of nodes based at least in part on available bandwidth of nodes between the node and the destination node, and wherein at least some nodes between the node and the destination node are not configured to process SIDs comprising compressed data comprising eight bits and determining the route further comprises preferentially selecting, by the COE, nodes for the route that are configured to process SIDs comprising compressed data comprising eight bits.

2. The method of claim 1, wherein determining the SID for the next hop node for the packet comprises shifting, by the node, eight bits from the SID for the node in the SID field to determine the SID for the next hop node within the SR circuit style configured network.

3. The method of claim 1, wherein determining the SID for the next hop node for the packet comprises:

reading, by the node, at least one bit in the SID field;

determining, by the node, that the at least one bit indicates a need to obtain the SID for the next hop node from a table within the node;

shifting, by the node, eight bits from the SID for the node in the SID field to determine an address within the table; and reading, by the node, the address within the table to obtain the SID for the next hop node.

4. The method of claim 1, wherein:

the COE and a network management service (NMS) are co-located within the SR circuit style configured network; and the method further comprises providing, by the COE, bandwidth policies with respect to the route to at least the node and the destination node.

5. The method of claim 4, wherein at least some of the nodes selected by the COE are not configured to process SIDs comprising compressed data comprising eight bits.

6. The method of claim 5, further comprising:

providing, by the COE, the bandwidth policies with respect to the route to the at least some of the nodes selected by the COE that are not configured to process SIDs comprising compressed data comprising eight bits.

7. The method of claim 1, wherein:

receiving the packet comprises receiving, by the node from a server, the packet; and the packet is in a form of a compressed Internet Protocol (IP) v6 packet.

8. A system comprising:

one or more processors; and one or more non-transitory computer-readable media storing computer-executable instructions that, when executed by the one or more processors, cause the one or more processors to perform actions comprising:

receiving, at a node within a segment routing (SR) circuit style configured network, a packet, wherein the packet includes a micro segment identifier (μSID) compressed carrier, wherein the μSID compressed carrier includes a SID field that includes a plurality of SIDs, and wherein at least some of the SIDs of the plurality of SIDs comprise compressed data comprising eight bits;

processing, by the node, at least part of the SID field;

based at least on the processing, determining a SID for a next hop node for the packet;

forwarding, by the node, the packet to the next hop node; and determining, by a crosswork optimization engine (COE) of the SR circuit style configured network, a route for the packet within the SR circuit style configured network from the node to a destination node, wherein the route comprises a plurality of nodes, wherein the determining the route comprises selecting the plurality of nodes based at least in part on available bandwidth of nodes between the node and the destination node, and wherein at least some nodes between the node and the destination node are not configured to process SIDs comprising compressed data comprising eight bits and determining the route comprises preferentially selecting, by the COE, nodes for the route that are configured to process SIDs comprising compressed data comprising eight bits.

9. The system of claim 8, wherein determining the SID for the next hop node for the packet comprises shifting, by the node, eight bits from the SID for the node in the SID field to determine the SID for the next hop node within the SR circuit style configured network.

10. The system of claim 8, wherein determining the SID for the next hop node for the packet comprises:

reading, by the node, at least one bit in the SID field;

determining, by the node, that the at least one bit indicates a need to obtain the SID for the next hop node from a table within the node;

shifting, by the node, eight bits from the SID for the node in the SID field to determine an address within the table; and reading, by the node, the address within the table to obtain the SID for the next hop node.

11. The system of claim 8, wherein:

the COE and a network management service (NMS) are co-located within the SR circuit style configured network; and the actions further comprise providing, by the COE, bandwidth policies with respect to the route to at least the node and the destination node.

12. The system of claim 11, wherein at least some of the nodes selected by the COE are not configured to process SIDs comprising compressed data comprising eight bits.

13. The system of claim 12, wherein the actions further comprise:

providing, by the COE, the bandwidth policies with respect to the route to the at least some of the nodes selected by the COE that are not configured to process SIDs comprising compressed data comprising eight bits.

14. The system of claim 8, wherein:

receiving the packet comprises receiving, by the node from a server, the packet; and the packet is in a form of a compressed Internet Protocol (IP) v6 packet.

15. One or more non-transitory computer-readable media storing computer-executable instructions that, when executed by one or more processors, cause the one or more processors to perform actions comprising comprising:

receiving, at a node within a segment routing (SR) circuit style configured network, a packet, wherein the packet includes a micro segment identifier (μSID) compressed carrier, wherein the μSID compressed carrier includes a SID field that includes a plurality of SIDs, and wherein at least some of the SIDs of the plurality of SIDs comprise compressed data comprising eight bits;

processing, by the node, at least part of the SID field;

based at least on the processing, determining a SID for a next hop node for the packet;

forwarding, by the node, the packet to the next hop node; and determining, by a crosswork optimization engine (COE) of the SR circuit style configured network, a route for the packet within the SR circuit style configured network from the node to a destination node, wherein the route comprises a plurality of nodes, wherein the determining the route comprises selecting the plurality of nodes based at least in part on available bandwidth of nodes between the node and the destination node, and wherein at least some nodes between the node and the destination node are not configured to process SIDs comprising compressed data comprising eight bits and determining the route comprises preferentially selecting, by the COE, nodes for the route that are configured to process SIDs comprising compressed data comprising eight bits.

16. The one or more non-transitory computer-readable media of claim 15, wherein:

determining the SID for the next hop node for the packet comprises shifting, by the node, eight bits from the SID for the node in the SID field to determine the SID for the next hop node within the SR circuit style configured network; or determining the SID for the next hop node for the packet comprises:

reading, by the node, at least one bit in the SID field;

determining, by the node, that the at least one bit indicates a need to obtain the SID for the next hop node from a table within the node;

shifting, by the node, eight bits from the SID for the node in the SID field to determine an address within the table; and reading, by the node, the address within the table to obtain the SID for the next hop node.

17. The one or more non-transitory computer-readable media of claim 15, wherein:

the COE and a network management service (NMS) are co-located within the SR circuit style configured network; and the actions further comprise providing, by the COE, bandwidth policies with respect to the route to at least the node and the destination node.

18. The one or more non-transitory computer-readable media of claim 17, wherein at least some of the nodes selected by the COE are not configured to process SIDs comprising compressed data comprising eight bits.

19. The one or more non-transitory computer-readable media of claim 18, wherein the actions further comprise:

providing, by the COE, the bandwidth policies with respect to the route to the at least some of the nodes selected by the COE that are not configured to process SIDs comprising compressed data comprising eight bits.

20. The one or more non-transitory computer-readable media of claim 15, wherein:

receiving the packet comprises receiving, by the node from a server, the packet; and the packet is in a form of a compressed Internet Protocol (IP) v6 packet.

* * * * *